US005868260A

United States Patent [19]

Bosman et al.

[11] Patent Number: 5,868,260

[45] Date of Patent: Feb. 9, 1999

[54] CAST IRON HYDROCYCLONE

[75] Inventors: Jeremy Brett Bosman, Pretoria; Gordon Anderson, Johannesburg, both of South Africa

[73] Assignee: Multotec Cyclones (PTY) Limited, South Africa

[21] Appl. No.: 664,378

[22] Filed: Jun. 14, 1996

[51] Int. Cl.[6] .................................. B04C 7/00; F16B 1/00

[52] U.S. Cl. ........................... 209/725; 403/341; 403/344; 403/407.1

[58] Field of Search ..................................... 209/725, 728, 209/729; 210/512.1; 403/24, 341, 344, 407.1

[56] References Cited

U.S. PATENT DOCUMENTS

| | | | |
|---|---|---|---|
| 4,333,499 | 6/1982 | Beck et al. | 209/725 X |
| 4,956,090 | 9/1990 | Robinson | 210/512.1 |
| 5,305,889 | 4/1994 | Ganz | 209/725 X |

*Primary Examiner*—Tuan N. Nguyen
*Attorney, Agent, or Firm*—Merchant, Gould, Smith, Edell, Welter & Schmidt

[57] ABSTRACT

A cast iron hydrocyclone (1,21) made of separate parts joined together, wherein at least two of the parts (2,3; 22,23) are held together by a pair of separate collars (7,8; 26,28) connected to one another, each collar being anchored to one or the other of the parts. The parts may be so anchored by bearing against an anchor provided on the parts.

7 Claims, 3 Drawing Sheets

CAST IRON HYDROCYCLONE

FIELD OF THE INVENTION

This invention relates to a cast iron hydrocyclone of the kind used to separate mineral pulps or slurries into heavy and light fractions.

The present invention is concerned more particularly, but not exclusively, with cast iron hydrocyclones for use in classification or as dense medium separators.

BACKGROUND TO THE INVENTION

Hydrocyclones of this kind may be made from cast iron because of the abrasive nature of the mineral pulps or slurries passing through them. The interior of the hydrocyclone is therefore subjected to wear, which is often localized. For example, the cone of the hydrocyclone may exhibit excessive wear at its lower, narrow end while exhibiting negligible wear at its upper, wider end. This results in the entire cone having to be discarded despite only localized wear having occurred.

A typical prior art cast iron hydrocyclone is shown in FIG. 1. The various parts of the hydrocyclone such as the inlet head (a), vortex finder (b), and cone (c) are joined together by means of slotted integral flanges (d). The slots on co-operating flanges align and receive bolts (e) which are tightened to hold the parts together. Where such a flange cracks or breaks the entire part has to be discarded.

OBJECT OF THE INVENTION

It is accordingly an object of the invention to overcome or at least diminish problems of the kind outlined above associated with prior art hydrocyclones.

SUMMARY OF THE INVENTION

According to the invention, in a cast iron hydrocyclone which is made of separate parts joined together, at least two of the parts are held together by a pair of separate collars connected to one another, each collar being anchored to one or the other of the parts.

Each collar may be anchored to its associated hydrocyclone part by bearing against anchoring means on the part.

The anchoring means may comprise a series of lugs formed integrally with the hydrocyclone part. The collar associated with the part may have a series of recesses formed therein corresponding to the lugs on the part, enabling the collar to be passed over the lugs, rotated and brought to bear against the lugs.

Alternatively, where the collar is associated with a part of increasing diameter the collar may be anchored to the part by bearing on a continuous flange formed integrally with the part.

In another alternative form a collar may be anchored to its associated hydrocyclone part by being bolted thereto.

In such a case the collar may carry a series of arms extending transverse to the plane of the collar and adapted to overlie corresponding pedestals provided on the associated part and having holes therein aligning with holes in the arms.

The invention also extends to a cast iron hydrocyclone part having anchoring means, the part being adapted to be held to a second hydrocylcone part by means of a collar anchored to the anchoring means.

BRIEF DESCRIPTION OF THE DRAWINGS

Preferred embodiments of the invention will now be described by way of example with reference to FIGS. 2 to 8 of the accompanying drawings in which.

DESCRIPTION OF PREFERRED EMBODIMENT

Figure 1:
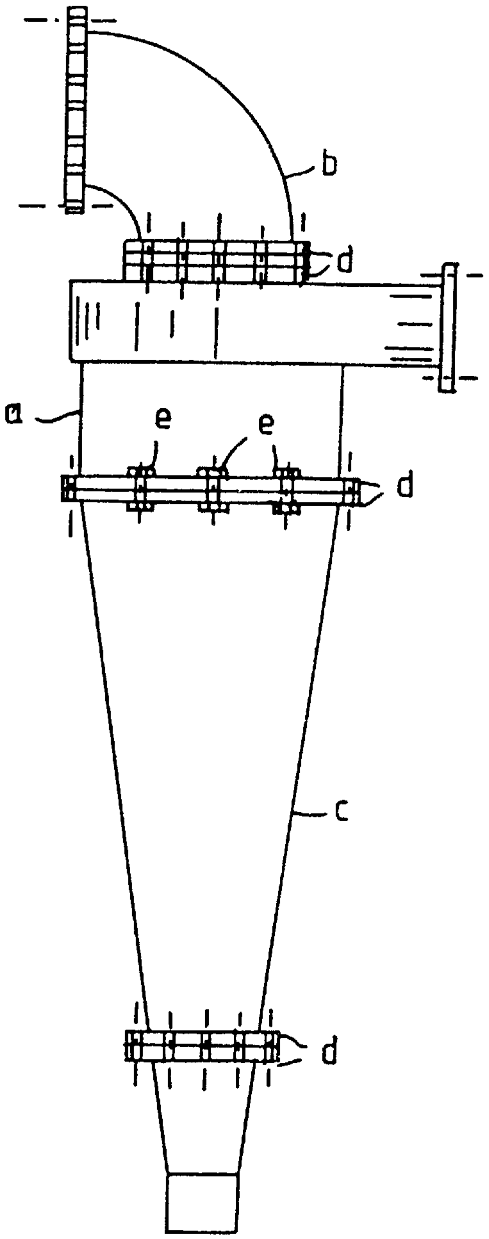
FIGURE 1 (PRIOR ART)
Figure 2:
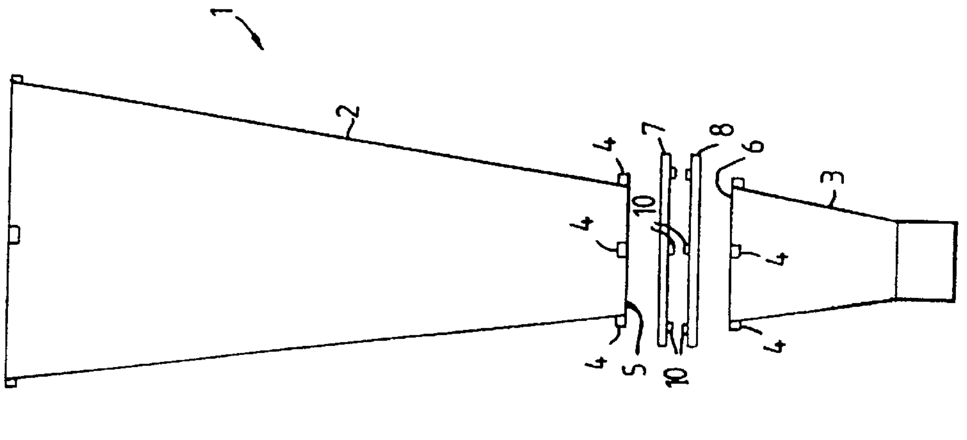
FIG. 2 is an exploded view of two parts of a hydrocyclone constructed according to the invention.
Figure 3:
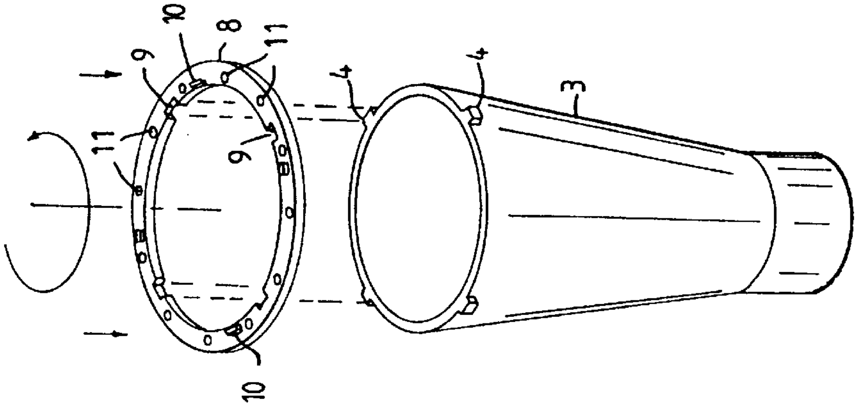
FIG. 3 is a perspective view of the lower of the two parts.
Figure 4:
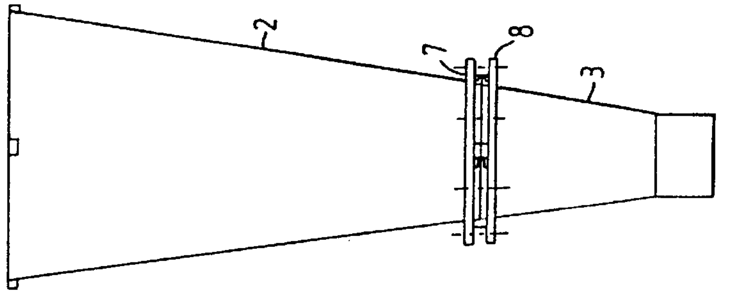
FIG. 4 is an elevation of the two parts joined together.

With reference to FIGS. 2 to 4, two parts of a cast iron hydrocyclone 1 are shown, being the cone 2 and spigot 3. The remaining parts of the hydrocyclone such as the inlet head and vortex finder are not shown for the sake of simplicity.

The parts 2, 3 are made from cast iron and each has lugs 4 formed integrally thereon. The lugs 4 are arranged in equal spaced relationship at the ends 5, 6 respectively of the parts 2, 3.

Two collars are provided, namely a collar 7 associated with the cone 2 and a collar 8 associated with the spigot 3. Each collar 7, 8 has a series of recesses 9 formed therein corresponding with the lugs 4 on the corresponding hydrocyclone part (FIG. 3). The recesses 9 are so arranged that a collar 7, 8 may be passed over the lugs 4 of the corresponding part 2, 3 whereupon the collar may be rotated and brought to bear against the lugs 4. Stop lugs 10 are provided on each of the collars 7, 8 to locate each collar in a predetermined position against the lugs 4.

The collars 7, 8 have holes 11 formed therein to enable them to be bolted together in an operative position.

In order to join the parts 2, 3 of the hydrocyclone 1, the collars 7, 8 are located in their operative positions described above, with the ends 5, 6 of the parts 2, 3 located on one another, whereupon the collars 7, 8 are bolted together. If required, a suitable seal or sealant may be located between the joined ends 5, 6 of the parts 2, 3.

The remaining parts of the hydrocyclone 1 may, if required, be joined in the same manner.

In an alternative arrangement, where a collar such as the collar 8 is associated with a part of increasing diameter such as the spigot 3, a continuous integral flange 14 may be provided in place of the lugs 4. Further alternatively, the collar may be anchored to a part such as the spigot 3 by engaging the exterior surface thereof.

Also, if a hydrocyclone part such as the cone 2 is known to be susceptible to wear at one end as opposed to the other end, the cone 2 itself may be split at a position along its height into two sections joined in the manner described above. In such a case the non-wearing section may be made with a lesser wall thickness than the wearing section. Should the wearing section be subject to excessive wear it can be discarded without having to replace the non-wearing section.

Figure 5:
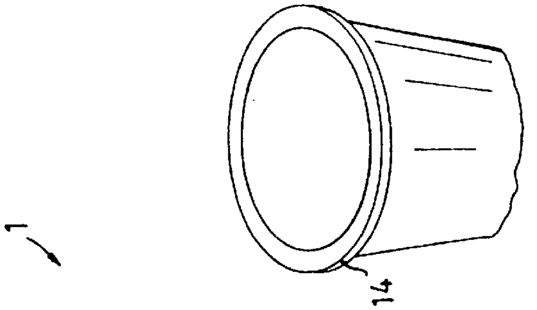
FIG. 5 is a broken perspective view of an alternative hydrocyclone part used in the invention.
Figure 8:
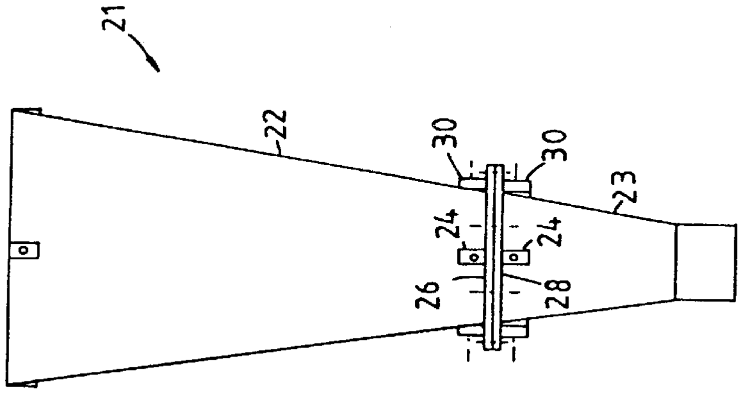
FIG. 8 is an elevation of the two parts of FIG. 5 joined together.
Figure 7:
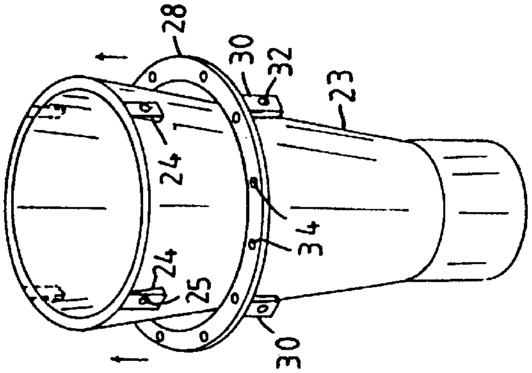
FIG. 7 is a perspective view of the lower of the two parts of FIG. 5.
Figure 6:
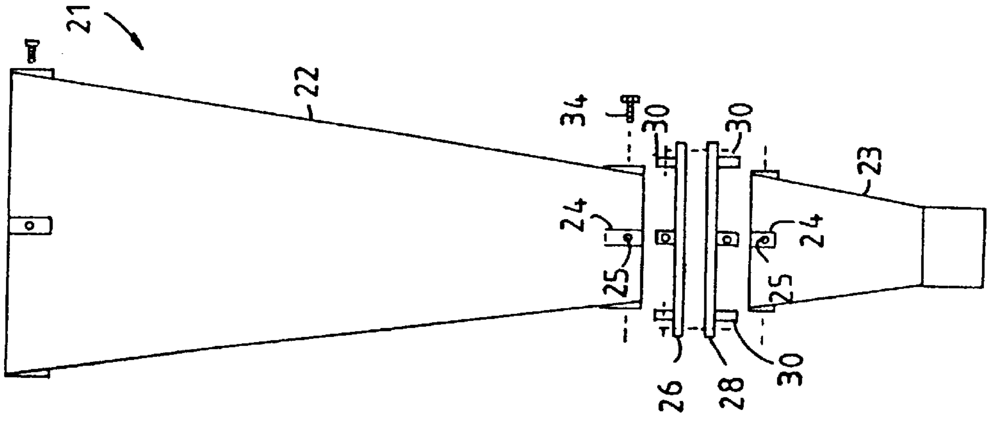
FIG. 6 is an exploded view of two parts of an alternative form of hydrocyclone constructed according to the invention.

In the embodiment of the invention illustrated in FIGS. 5 to 7, a hydrocyclone 21 having parts 22, 23 is shown, similar to the parts 2, 3 described above. Each of the parts 22, 23 has pedestals 24 formed integrally thereon which have blind holes 25. The pedestals 24 of the two parts align with one another in an operative position.

Two collars are provided, a collar 26 associated with the cone 22 and a collar 28 associated with the spigot 23. Each collar 26, 28 has a series of arms 30 formed integrally therewith and extending transversely to the plane of the collar. The arms 30 are so arranged that they correspond with the pedestals 24 on the cone 22 and spigot 23 and overlie the pedestals in an operative position of the collars. Each arm 30 has a hole 32 therein which in the operative position aligns with a corresponding blind hole 25 in a pedestal 24.

In order to join the parts 22, 23, the narrow end of the cone 22 and the wide end of the spigot 23 are located on one another and the collars 26, 28 are located in their operative positions as described above. Bolts or studs 34 are passed through the holes 32 in the arms 30 of the collars 26, 28 and are located in the blind holes 25 of the pedestals 24 to hold the collars 26, 28 fast to their respective parts 22, 23. The collars 26, 28, which also have bolt holes 34 therein, may now be bolted together to hold the parts 22, 23 together. If required, a suitable sealant may be located between the joining faces of the parts 22, 23. Thus the invention provides a useful improvement over prior art cast iron hydrocyclones.

Many other embodiments of the invention may be made without departing from the scope of the invention defined in the appended claims.

We claim:

1. A cast iron hydrocyclone part having anchoring means, the part being adapted to be held to a second hydrocyclone part by means of a collar anchored to the anchoring means comprising lugs against which the collar bears.

2. A part as claimed in claim 1 in which the anchoring means comprise threaded holes to which the collar is bolted.

3. A cast iron hydrocyclone made of separate parts joined together, wherein at least two of the parts are held together by a pair of separate collars connected to one another, each collar being anchored to one or the other of the parts, and wherein at least one of the collars is anchored to its associated hydrocyclone part by bearing against anchoring means comprising a series of lugs formed integrally with the hydrocyclone part.

4. A hydrocyclone as claimed in claim 3 in which the collar associated with the hydrocyclone part has a series of recesses formed therein corresponding to the lugs on the part, enabling the collar to be passed over the lugs, rotated and brought to bear against the lugs.

5. A hydrocyclone as claimed in claim 3 in which, in the case where the collar is associated with a hydrocyclone part of increasing diameter, the collar is anchored to the part by bearing on a continuous flange formed integrally with the part.

6. A hydrocyclone as claimed in claim 3 in which a collar is anchored to its associated hydrocyclone part by being bolted thereto.

7. A hydrocyclone as claimed in claim 6 in which the collar carries a series of arms extending transverse to the plane of the collar an adapted to overlie corresponding pedestals provided on the associated part and having holes therein aligning with holes in the arms.

* * * * *